US006164678A

United States Patent [19]

Fryer

[11] Patent Number: 6,164,678

[45] **Date of Patent: *Dec. 26, 2000**

[54] NON-ROTATING WHEEL DISK AND ATTACHABLE ACCESSORIES

[76] Inventor: Donald E. Fryer, 1884 Johnson Rd., Macon, Ga. 31210

[ * ] Notice: This patent is subject to a terminal disclaimer.

[21] Appl. No.: 08/390,751

[22] Filed: Feb. 17, 1995

[51] Int. Cl.[7] .......... B62B 11/00

[52] U.S. Cl. .......... 280/304.1; 280/250.1

[58] Field of Search .......... 280/250.1, 304.1; 301/37.25, 37.1; 297/DIG. 4; 224/407

[56] References Cited

U.S. PATENT DOCUMENTS

| | | | |
|---|---|---|---|
| 2,169,237 | 8/1939 | Gasco . | |
| 2,707,131 | 4/1955 | Sunberg . | |
| 2,935,361 | 5/1960 | Aske | 301/37.25 |
| 3,918,186 | 11/1975 | Gray . | |
| 4,339,061 | 7/1982 | Dunn | 280/304.1 X |
| 4,366,964 | 1/1983 | Farey et al. | 280/250.1 |
| 4,375,295 | 3/1983 | Volin . | |
| 4,593,929 | 6/1986 | Williams | 280/304.1 X |
| 4,678,239 | 7/1987 | Matsushita . | |
| 4,805,925 | 2/1989 | Haury et al. | 280/250.1 |
| 4,929,030 | 5/1990 | Park . | |
| 4,981,329 | 1/1991 | Koch et al. . | |
| 5,016,944 | 5/1991 | Schultz . | |
| 5,161,630 | 11/1992 | Garin, III et al. | 280/250.1 X |
| 5,190,354 | 3/1993 | Levy et al. . | |
| 5,482,305 | 1/1996 | Jeffries et al. | 280/250.1 |

FOREIGN PATENT DOCUMENTS

| | | | |
|---|---|---|---|
| 851 780 | 8/1952 | Germany | 301/37.1 |
| 3117 | of 1914 | United Kingdom . | |

*Primary Examiner*—Brian L. Johnson
*Assistant Examiner*—Victor E. Johnson
*Attorney, Agent, or Firm*—Jones & Askew

[57] ABSTRACT

The present invention provides a non-rotating wheel disk for the main wheels of conventional wheelchairs. The non-rotating wheel disks shield the spokes from damage and a user's hands from injury. Easily accessible pockets for storing needed materials, catheter bags, and the like, are attached to an outer surface of the non-rotating disk. An exercise device for use from a conventional wheelchair is also provided. The exercise device may be used alone or in combination with the wheel disk of the present invention, which provides additional support for the exercise device.

7 Claims, 7 Drawing Sheets

NON-ROTATING WHEEL DISK AND ATTACHABLE ACCESSORIES

TECHNICAL FIELD

The present invention relates generally to wheels for a wheelchair, and more particularly to a non-rotating wheel disk for a wheelchair and to accessories that are attachable to the same.

BACKGROUND OF THE INVENTION

Wheelchairs are well known in the prior art as a means of transportation for injured or disabled persons. Although sophisticated wheelchairs can be custom built at great expense, the majority of wheelchairs are fairly basic in design.

Typically, conventional wheelchairs comprise a pair of tubular side frames with a flexible seat disposed there between. The side frames are connected to one another under the seat by a cross brace that allows the side frames to be laterally folded together for compact storage of the wheelchair. A pocket is provided on the back side of the seat for storing materials of the user.

A wheelchair travels on a pair of main spoked wheels and a pair of front caster wheels. The main wheels are conventionally journaled to the side frames to allow forward and rearward travel of the wheelchair. The main wheels are relatively large and include a coaxially mounted push-ring to facilitate movement of the wheelchair by the user.

The front caster wheels are vertically axled to the side frames to allow the wheelchair to be turned in any direction. Thus, the user may move the wheelchair and negotiate obstacles without assistance. In this way, conventional wheelchairs fulfill their essential purpose of providing a means of transportation for the user.

An inadequacy of conventional wheelchairs, however, is a lack of basic accessories to support the needs and activities of users. This is especially problematic in an era where disabled persons are increasingly active and self-reliant.

For example, because a wheelchair user must use both hands to move him or herself in a wheelchair, he or she cannot carry materials unless an area is provided on the wheelchair for storing the materials during transit. Although the conventional wheelchair has a storage pocket on the back side of the seat, this pocket is inaccessible to a user. Thus, the user can only carry and use materials that other individuals have stored and later removed for the user. Such reliance on others greatly reduces the freedom of the user. Thus, there exists a need in the art for a wheelchair storage area that is accessible to the user and that does not interfere with the operation of the wheelchair.

A related problem with conventional wheelchairs is the storage of catheter bags for users with bladder related medical problems. Catheter bags collect urine for such users via a catheter tube and thereby allow them to travel freely without fear of an embarrassing accident.

Presently, catheter bags are hooked either to the side frame of a wheelchair or to the cross brace beneath the seat. A problem with hooking a catheter bag to a side frame is that it may tangle with an adjacent main wheel and rupture or pull the catheter tube free, which can injure the user because the catheter tube is secured in the user's urethra by an inflated balloon. Another problem with hooking a catheter bag to a side frame is that urine will back up in the catheter tube and cause a bladder infection if the catheter bag is not maintained at a position below the user's bladder.

Hooking a catheter bag to a cross brace beneath the seat will prevent the problem of urine backing up in the catheter tube. However, because the cross brace is beneath the seat, the catheter bags often drag on the ground. As a result, catheter bags are easily dislodged from a cross brace, causing them to rupture or to pull the catheter tube free. Furthermore, the cross brace is not accessible to the user. Thus, use of a cross brace for storing a catheter bag requires the user to rely on other individuals.

Additionally, the presence of a catheter bag, which can be as large as one liter, is obvious to all bypassers when hooked to either the side frame or the cross brace of a wheelchair. Such publicity of a user's private medical condition can cause embarrassment and lead the user to shy away from public areas. Therefore, there exists a need in the art for a safe and concealed means of storing catheter bags on a wheelchair.

Another problem associated with conventional wheelchairs is a lack of exercises that can be performed from a wheelchair. This is especially problematic for disabled persons, such as paraplegics, who are largely confined to a wheelchair and are thus limited to activities that can be performed from the wheelchair. Therefore, there exists a need in the art for a means of performing exercises from a conventional wheelchair.

Yet another problem associated with conventional wheelchairs is a lack of protection for the user's hands and fingers, which can become caught in the spokes of the main wheels and injured. Additionally, the spokes can become entangled with foreign objects, causing damage to the spokes and possibly causing the wheelchair to become stuck and the user stranded. Thus, there exists a need in the art for an effective means of shielding the spokes from a user's hands and other foreign objects.

SUMMARY OF THE INVENTION

The present invention provides a solution to solving the problems in the art described above by providing a non-rotating wheel disk for the main wheels of conventional wheelchairs. The non-rotating wheel disks shield the spokes from damage and a user's hands from injury. Easily accessible pockets for storing needed materials, catheter bags, and the like, may be attached to an outer surface of the non-rotating disk. An exercise device for use from a conventional wheelchair is also provided. The exercise device may be used alone or in combination with the wheel disk of the present invention, which provides additional support for the exercise device.

The non-rotating wheel disk of the present invention comprises a disk for fixable attachment to an outer end of a non-rotating wheel axle spindle of a wheelchair. Preferably, the disk is circular in shape and is coaxial with the wheel axle spindle when the disk is attached thereto. At least one pocket accessible to a wheelchair user can be attached to an outer surface of the disk that faces away from the wheelchair.

The exercise device of the present invention comprises an elongated handle and a cylinder assembly. The elongated handle is for pivotal attachment to the outer end of the non-rotating wheel axle spindle. A first end of the cylinder assembly is slideably attached to the elongated handle. The second end of the cylinder assembly is for pivotal attachment to the wheelchair at a point forward of the non-rotating wheel axle spindle.

Thus, it is an object of the present invention to provide a non-rotating wheel disk that shields the spokes of main wheels of conventional wheelchairs.

It is another object of the present invention to provide user accessible pockets for conventional wheelchairs.

It is a further object of the present invention to provide a safe catheter bag pocket for conventional wheelchairs.

It is yet another object of the present invention to provide an exercise device that can be used from a conventional wheelchair.

Further objects, features and advantages of the present invention will become apparent upon reviewing the following description of the preferred embodiments of the invention, when taken in conjunction with the drawings and appended claims.

DETAILED DESCRIPTION

Figure 1:
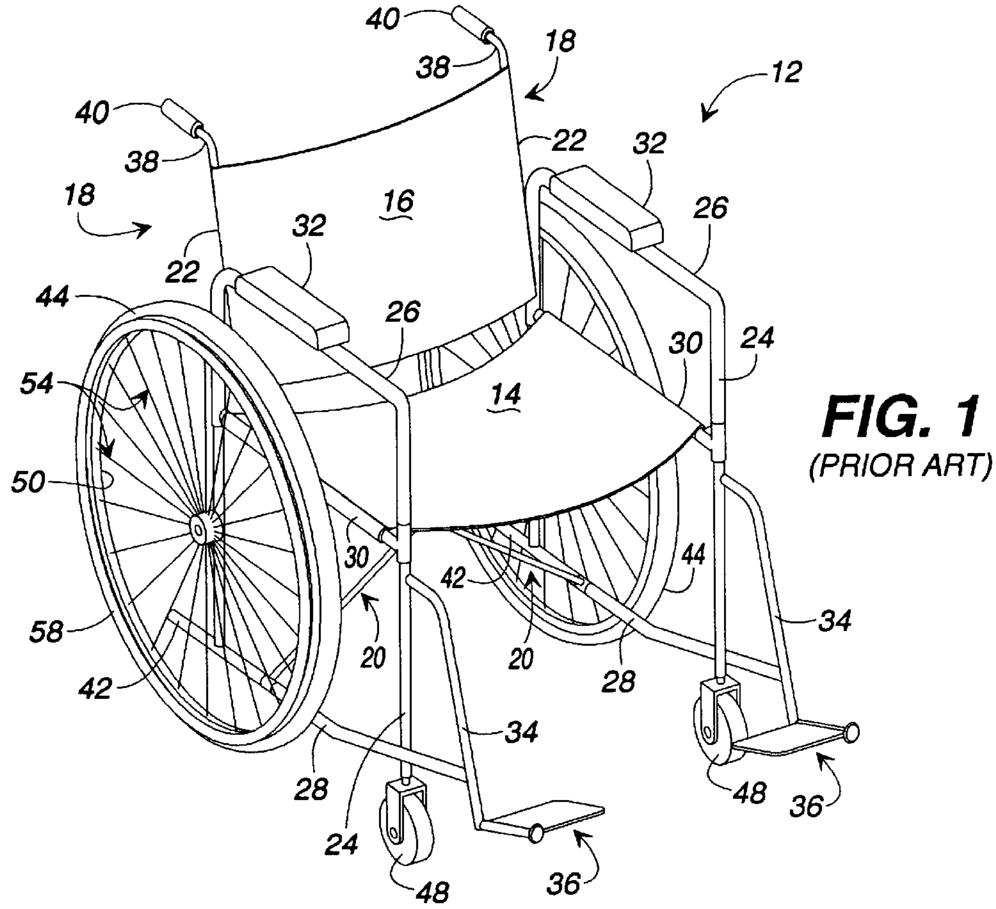
FIG. 1 (PRIOR ART)
FIG. 1 is a perspective view of a conventional laterally folding wheelchair for use in conjunction with the preferred embodiment of the present invention.
Figure 2:
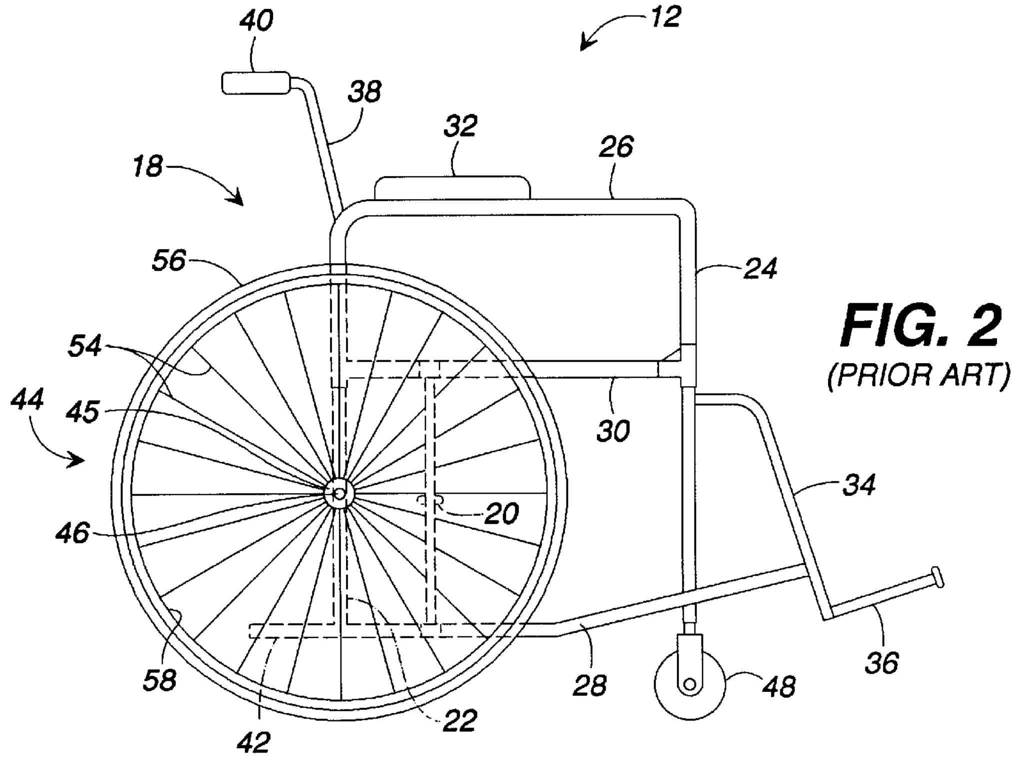
FIG. 2 (PRIOR ART)
FIG. 2 is a side view of the wheelchair of FIG. 1 for use in conjunction with the preferred embodiment of the present invention

Referring now in more detail to the drawings, in which like numerals refer to like parts throughout the several views, FIGS. 1–2 show a conventional laterally folding wheelchair 12. The wheelchair 12 comprises a flexible seat 14 and a flexible back 16 suspended between a pair of wheeled side frames 18. The side frames 18 are interconnected by a cross brace 20, which allows the side frames 18 to be folded together for storage.

The side frames 18 are mirror images of one another and typically comprise a plurality of welded together tubular steel members. A rear vertical member 22 and a front vertical member 24 are provided as supports for mounting the wheels of the wheelchair 12. The front and rear vertical members are joined at their tops by a horizontal arm support member 26 and at their base by a horizontal base member 28. The horizontal base member 28 extends rearward beyond the rear vertical member 22 to form a tipping lever 42 for raising the front end of the wheelchair 12 over curbs or similar obstacles.

An arm rest 32 is disposed on the arm support member 26 for the comfort of the user. A rear handle 38 extends backward from the top of the rear vertical member 22 for pushing the wheelchair 12. A hand grip 40 is provided at the end of the rear handle 38 for the convenience of a person pushing the wheelchair 12.

A horizontal seat support member 30 extends between the rear vertical member 22 and the front vertical member 24 for mounting the flexible seat 14. A hanging bracket 34 extends forward from the front vertical member 24 to support a pivotally connected foot rest 36.

A pair of front caster wheels 48 for turning the wheelchair 12 are vertically axled to the front vertical member 24 of each side frame 18. A pair of rear main wheels 44 with a center hub assembly 45 are conventionally journaled to a non-rotating wheel axle spindle 46. The center hub assembly 45 of each main wheel 44 is connected to a concentric rim 50 by a series of spokes 54. A tire 56 and a push-ring 58 are mounted to the rim 50.

Figure 3:
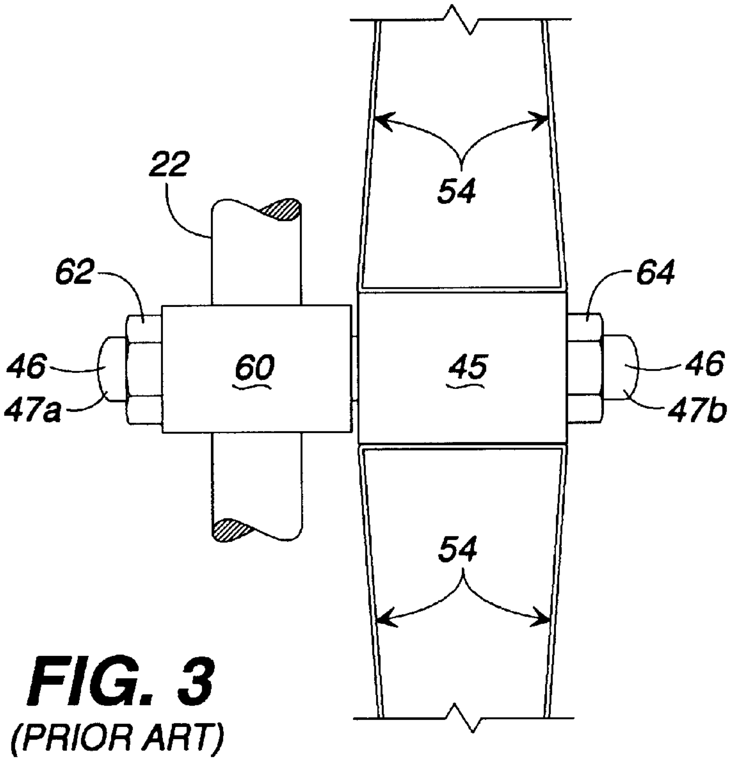
FIG. 3 (PRIOR ART)
FIG. 3 is a cross sectional elevation view of a portion of FIG. 1 showing a main wheel assembly journaled to a non-rotating wheel axle spindle.

As shown by FIG. 3, the wheel axle spindle 46 is connected to the rear vertical member 22 of the side frame 18 via a mounting collar 60, which is permanently affixed to the rear vertical member 22. The wheel axle spindle 46 is threaded at both ends and secured at an inner end **47*a* by a conventional hex nut 62, which is threaded to receive the inner end 47*a* of the wheel axle spindle 46. An outer end 47*b* of the wheel axle spindle 46 protrudes a select distance from the mounting collar 60 for journaling the center hub assembly 45 of the main wheel 44. The center hub assembly 45 is secured in place by a conventional hex nut 64, which is threaded to receive the outer end 47*b* of the wheel axle spindle 46**.

Figure 5:
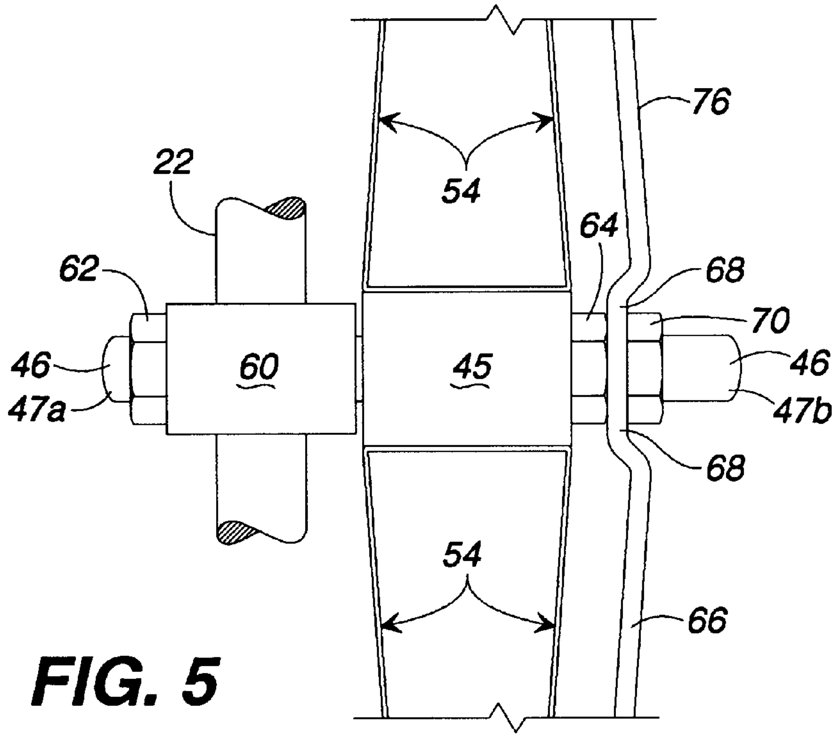
FIG. 5 is a cross sectional elevation view of a portion of FIG. 4 showing the non-rotating wheel disk attached to the non-rotating wheel axle spindle in accordance with the preferred embodiment of the present invention.
Figure 4:
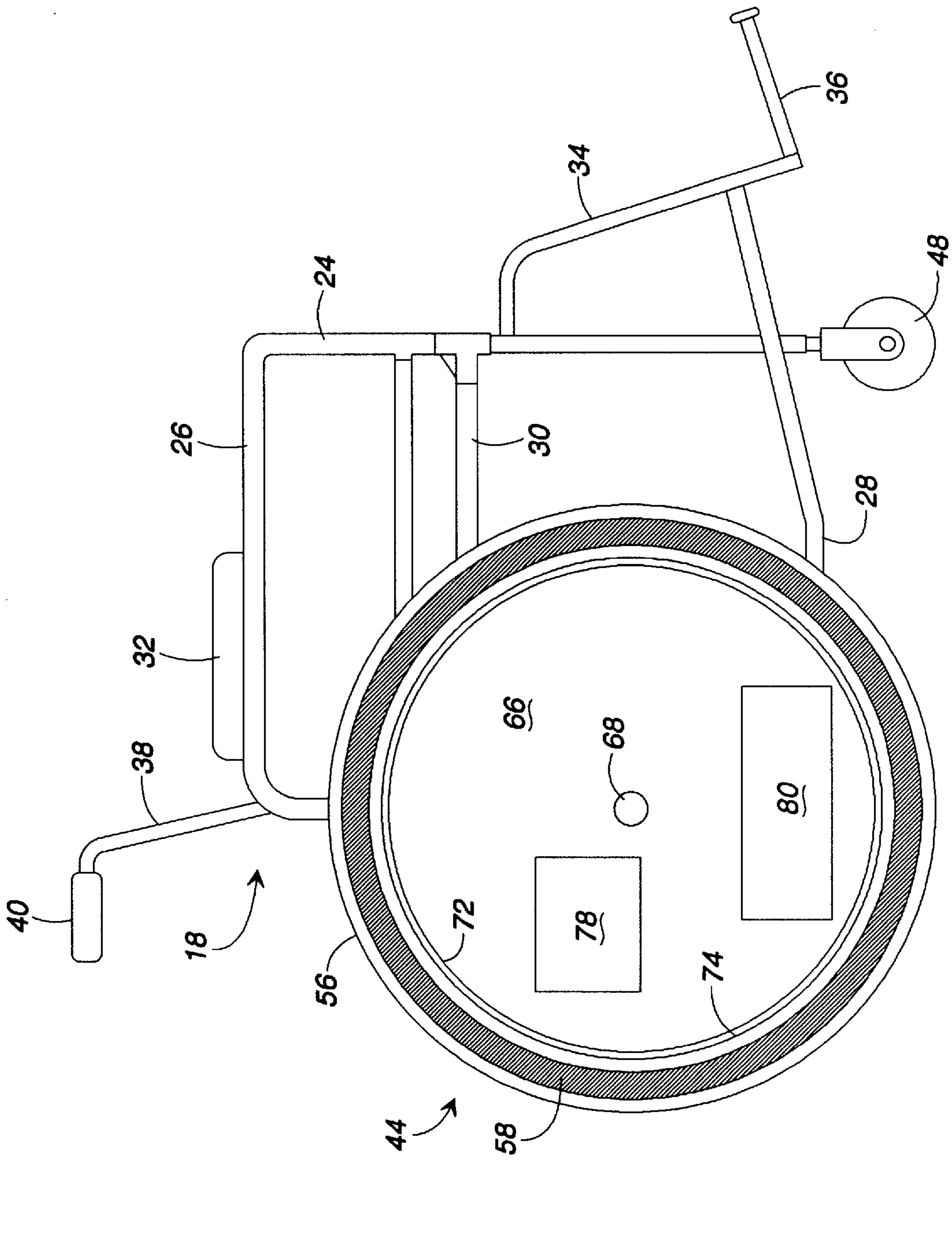
FIG. 4 is a side view of the wheelchair of FIG. 1 showing a non-rotating wheel disk in accordance with the preferred embodiment of the present invention.

As shown by FIGS. 4–5, a non-rotating wheel disk 66 attaches to the outer end **47*b* of the wheel axle spindle 46. If the wheel axle spindle 46 is too short to receive the wheel disk 66**, a new wheel axle spindle (not shown) of adequate length can be simply substituted for the existing wheel axle spindle.

The wheel disk 66 is attached to the wheel axle spindle 46 via a center hole (not shown) and is secured by a conventional hex nut 70, which is threaded to receive the outer end **47*b* of the wheel axle spindle 46. The wheel disk 66 is maintained in spaced apart relation with the spokes 54 of the main wheel 44 by a recessed hub 68 at the point of attachment between the wheel disk 66 and the wheel axle spindle 46. The remaining portion of the wheel disk 66 is contoured to follow the slope of the spokes 54 to minimize the protrusion of the wheel disk 66 from the main wheel 44**.

In the preferred embodiment, as best shown by FIG. 4, the wheel disk 66 is circular with a circumference 72 that is coaxial with the wheel axle spindle 46. Accordingly, the wheel disk 66 is also coaxial with the main wheel 44 and the push-ring 58. Thus, the wheel disk 66 effectively shields the spokes 54 from a user's hands and other foreign objects.

The circumference 72 of the wheel disk 66 is less than that of the push-ring 58 to prevent interference with the pushing of the wheelchair. In the preferred embodiment, the wheel disk 66 is sized to leave a gap of one-half inch between its circumference 72 and the push-ring 58. For the comfort of a user during pushing operations, a padding 74 is disposed along the circumference 72 of the wheel disk 66. In the preferred embodiment, the padding 74 is an open-cell foam rubber having an adhesive backing that is applied directly to the circumference 72 of the wheel disk 66.

The wheel disk 66 may be constructed of plastic, metal, or other durable materials. The preferred material depends on the use of the wheel disk 66. If the wheel disk 66 will not be subject to heavy loads, injection molded plastic is preferred because it is inexpensive, lightweight and durable. Alternatively, if the wheel disk 66 is subject to heavy loads, metal is preferred for its strength.

A first, or upper, pocket 78 and a second, or lower, pocket 80 extend from an outer surface 76 of the wheel disk 66. In the preferred embodiment, the upper pocket 78 and the lower pocket 80 are selectively attachable to the wheel disk 66 with velcro strips (not shown). This allows the pockets to be easily added and removed as needed.

The upper pocket 78 is sized to receive and store materials of a general nature and is located within easy reach of a user in the wheelchair 12. Thus, the upper pocket 78 provides a storage area that is accessible to the user and that does not interfere with the operation of the wheelchair 12.

The lower pocket 80 is sized to receive a catheter bag and is positioned well below the seat 14 to insure proper drainage into the catheter bag. The catheter tube runs from a user to the edge of the seat 14 and then into the catheter bag inside the lower pocket 80. Thus, the lower pocket 80 provides a safe and concealed means of storing a catheter bag on a wheelchair 12.

Figure 6:
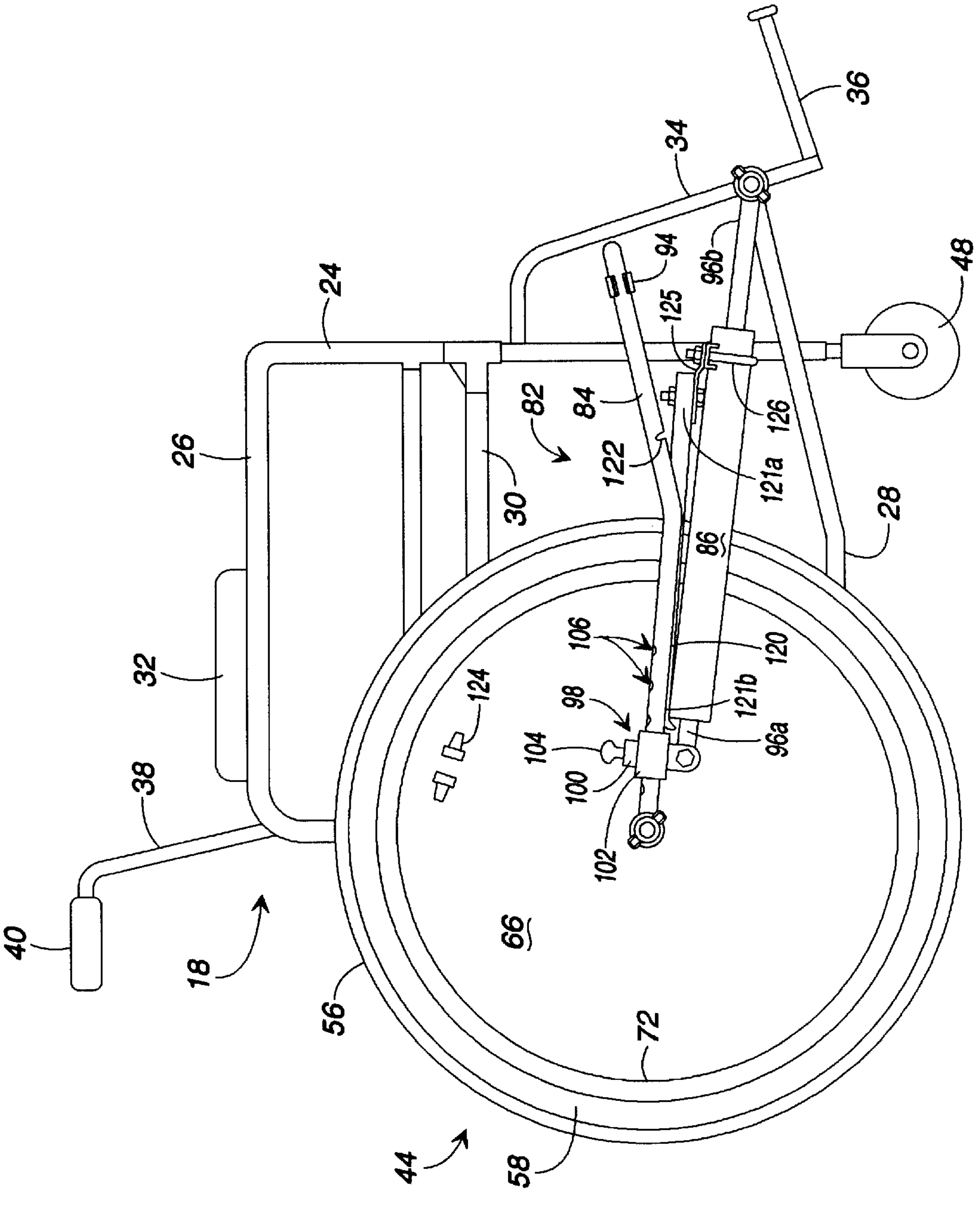
FIG. 6 is a side view of the wheelchair of FIG. 1 showing an exercise device in accordance with the preferred embodiment of the present invention.
Figure 7:
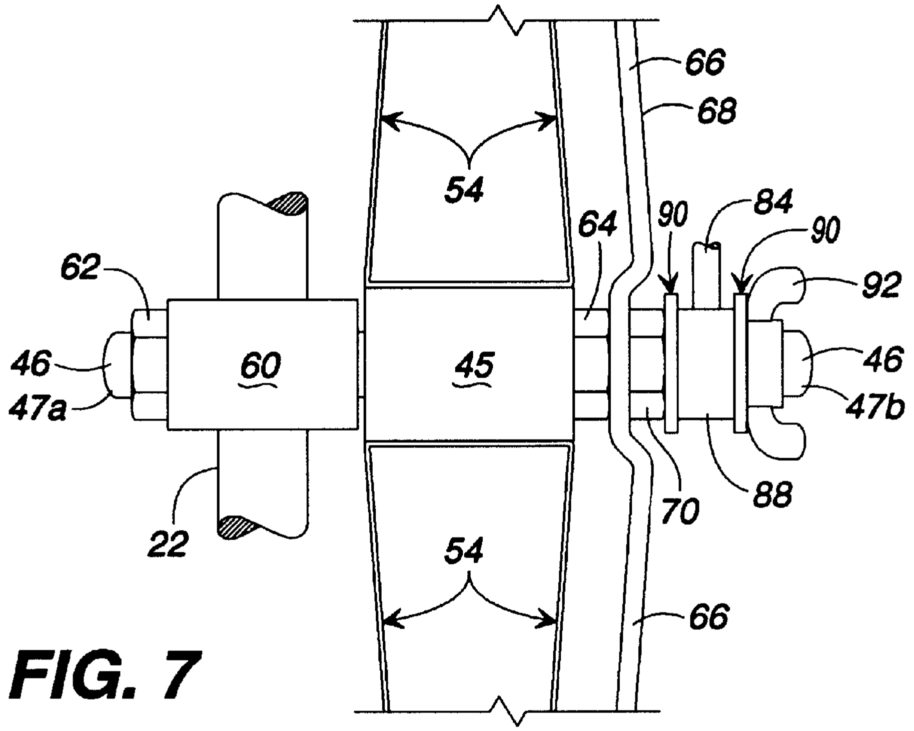
FIG. 7 is a cross sectional elevation view of a portion of FIG. 6 showing an elongated handle of the exercise device pivotally attached to the non-rotating wheel axle spindle of the wheelchair in accordance with the preferred embodiment of the present invention.
Figure 8:
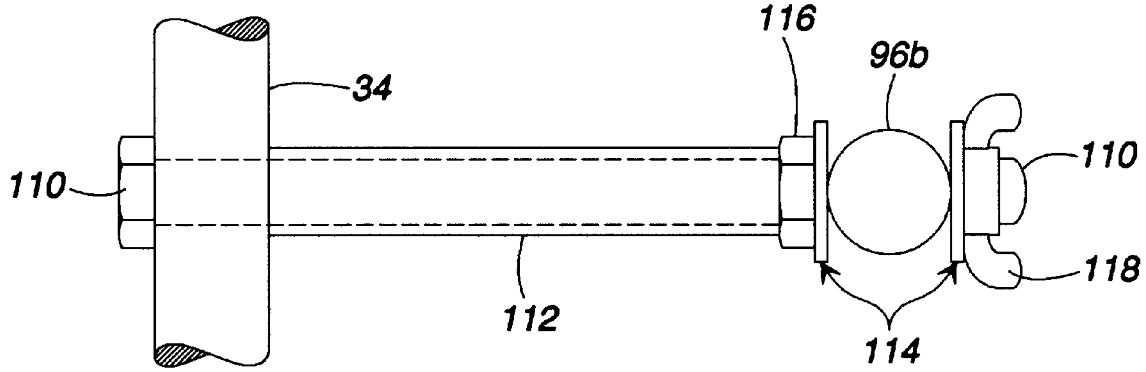
FIG. 8 is a cross sectional elevation view of a portion of FIG. 6 showing a cylinder of the exercise device pivotally attached to a hanging bracket of the wheelchair in accordance with the preferred embodiment of the present invention.

As shown by FIGS. 6–8, an exercise device 82 is provided for attachment to, and use from, the wheelchair 12. The exercise device 82 comprises an elongated handle 84 and a cylinder assembly 86. In the preferred embodiment, the exercise device 82 is attached to the wheelchair 12 with the wheel disk 66 already secured thereon. However, it should be understood by those skilled in the art that the exercise device 82 can be used independently of the wheel disk 66.

As shown best by FIG. 7, the elongated handle 84 is pivotally attached to the wheel axle spindle 46 via a collar 88. The collar 88 is positioned between a pair of washers 90 and secured by a conventional wing nut 92, which is threaded to receive the outer end **47*b* of the wheel axle spindle 46. The washers 90 allow the collar 88 to pivot relative to the hex nut 70 and the non-rotating wing nut 92. The wing nut 92 is preferred because it allows the exercise device 82 to be easily attached to and removed from the wheelchair 12** without the aid of tools. It will be understood by those skilled in the art, however, that other types of nuts can be used within the scope of the present invention.

Returning to FIG. 6, the elongated handle 84 comprises a pair of telescoping tubes. The telescoping tubes allow the length of the elongated handle 84 to be adjusted for the size and strength of a user and for the type of exercise to be performed. A spring clip 94 fixably secures the telescoping tubes relative to one another when the elongated handle 84 is adjusted to its desired length. To optimize the benefit of the exercise device 82 from the wheelchair 12, the elongated handle 84 is bent upward at a slight angle.

The cylinder assembly 86 is slideably attached at a first end **96*a* to the elongated handle 84 by a sleeve assembly 98. The sleeve assembly 98 comprises a sleeve 102 and a binding mechanism 100. The sleeve 102 surrounds the elongated handle 84 and is pivotally bolted to the cylinder assembly 86 to translate pivoting motion of the handle 84 into force on the cylinder assembly 86. The binding mechanism 100 includes a pin 104 for engagement with a series of discrete holes 106 in the elongated handle 84. The pin 104 is biased toward the discrete holes 106** so that it remains in a hole once set by a user.

As shown best by FIG. 8, the cylinder assembly 86 is pivotally attached at a second end **96*b* to the hanging bracket 34. The second end 96*b* is pivotally attached by an elongated bolt 110 that is of a sufficient length to align the second end 96*b* the cylinder assembly 86 with the first end 96*a*. A spacer bar 112 is disposed between the second end 96*b* and the hanging bracket 34 to retain the second end 96*b* in substantial alignment with the first end 96*a***.

The second end **96*b* is pivotally attached to the elongated bolt 110 between a pair of washers 114, which are secured between a conventional hex nut 116 and a wing nut 118. Both the hex nut 116 and the wing nut 118 are threaded to receive the elongated bolt 110**.

In the preferred embodiment, the elongated bolt 110, the spacer bar 112, and the hex nut 116 remain in place even if the exercise device 82 is removed from the wheelchair 12. Accordingly, the exercise device 82 can be attached to and removed from the wheelchair 12 by manipulating the wing nut 118. The wing nut 118 is preferred because it allows the exercise device 82 to be attached and removed without the aid of tools.

Returning to FIG. 6, a support bar 120 is provided for securing the elongated handle 84 in an upright position. The support bar 120 is pivotally attached at a first end **121*a* to the cylinder assembly 86. In the preferred embodiment, the first end 121*a* is pivotally attached by a flexible band of material 125 that is fixably secured to the cylinder assembly 86 by a U-clamp 126. The support bar 120 is selectively attachable at a second end 121*b* to the elongated handle 84, which includes a notch 122 shaped to receive the second end 121*b***.

Where the exercise device 82 is used in conjunction with the wheel disk 66, a clamp 124 is provided on the wheel disk 66 for further securing the elongated handle 84 in an upright position. The clamp 124 may also be used as a solitary support for the elongated handle 84 if the support bar 120 is not provided.

As described above, the exercise device can be easily attached to and used from a wheelchair. Thus, it provides a user with exercises that can be performed from a wheelchair.

In the preferred embodiment of the present invention, a wheel disk 66 is provided for both main wheels 44 of the wheelchair 12. The wheel disks 66 are attached to the wheel axle spindle 46 of each main wheel 44 by placing the center hole (not shown) of the wheel disk 66 over the outer end **47*b* of the wheel axle spindle 46 and tightening the conventional hex nut 70**. This can be easily accomplished with a wrench or a pair of pliers.

As described above, the upper pocket 78 and the lower pocket 80 are preferably attached to the wheel disk 66 by means of velcro strips on the outer surface 76 of the wheel disk 66. This allows the pockets to be conveniently added and removed as needed. Nevertheless, if the pockets are used in conjunction with the exercise device 82, they should be located out of the device's way to avoid emptying and removing the pockets each time the exercise device 82 is used.

In the preferred embodiment, an exercise device 82 is provided along both sides of the wheelchair 12. Each exercise device 82 is attached by placing one of the washers 90 over the outer end **47*b* of the wheel axle spindle 46 and one of the washers 114 over the elongated bolt 110. Next, the collar 88 of the elongated handle 84 is slid over the outer end 47***b* of the wheel axle spindle 46 and the second end 96*b* of the cylinder assembly 86 is slid over the elongated bolt 110. The second of the pair a washers 90 is then placed over the outer end 47*b* of the wheel axle spindle 46 and the second of the washers 114 is placed over the elongated bolt 110. Next, wing nut 92 is hand tightened to the outer end 47*b* of the wheel axle spindle 46 and wing nut 118 is hand tightened to the elongated bolt 110.

When the exercise device 82 is not in use, it may be removed by the reverse process as that described above. If the exercise device 82 is to be left on the wheelchair 12 during periods of non use, it is folded out of the way as show by FIG. 6.

Figure 9:
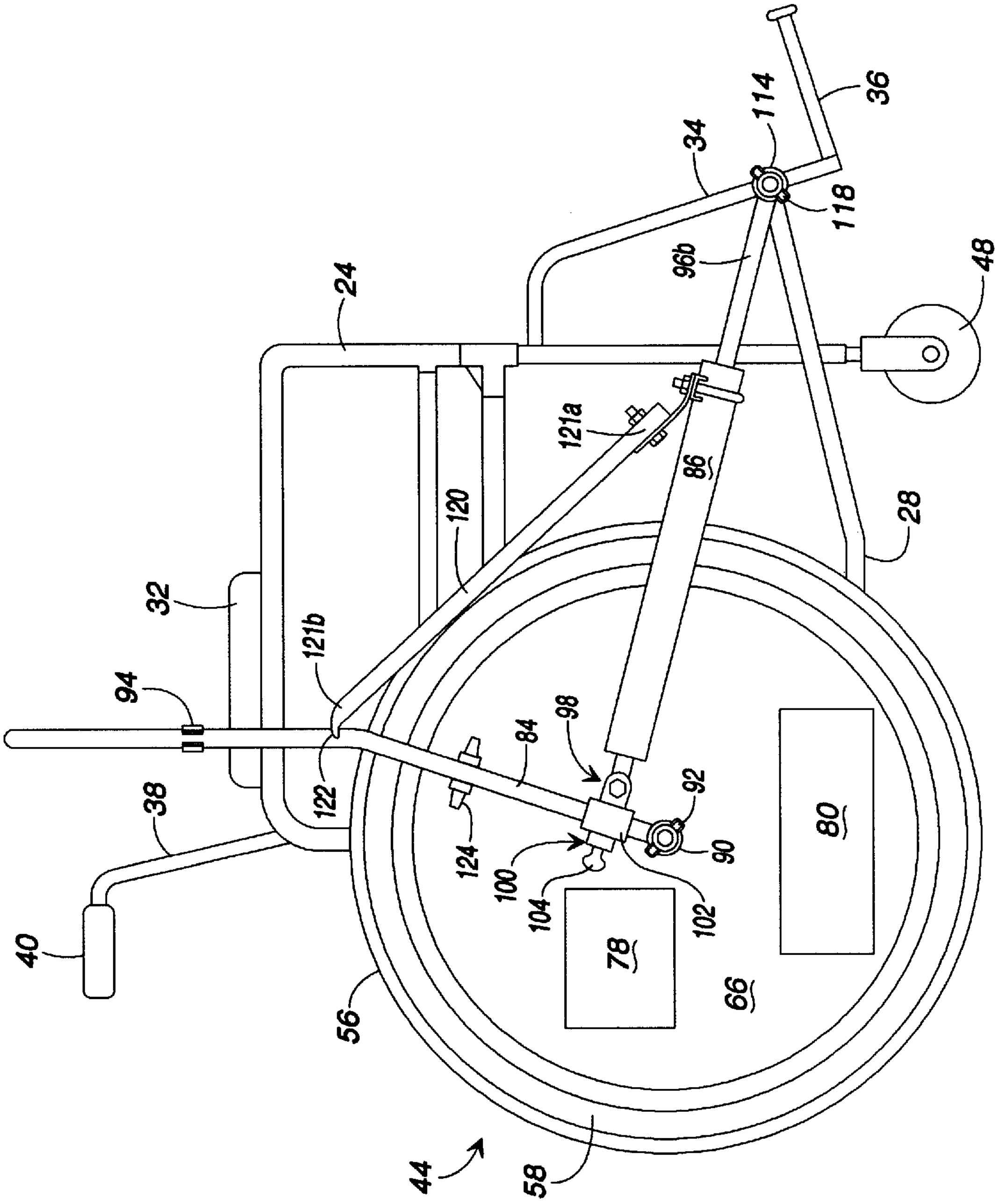
FIG. 9 is a side view of the wheelchair of FIG. 6 showing the elongated handle locked into a pull-up position for exercise from the wheelchair in accordance with the preferred embodiment of the present invention.

As shown by FIG. 9, the elongated handle 84 is extended and locked into an upright position for pull-up exercises by the support bar 120 and the clamp 124. The pull-up exercises allow a user temporally to remove the weight of their body from their seat area. Accordingly, such pull-up exercises provide relieve from soreness and bed sores in that area of the user's body.

Figure 10:
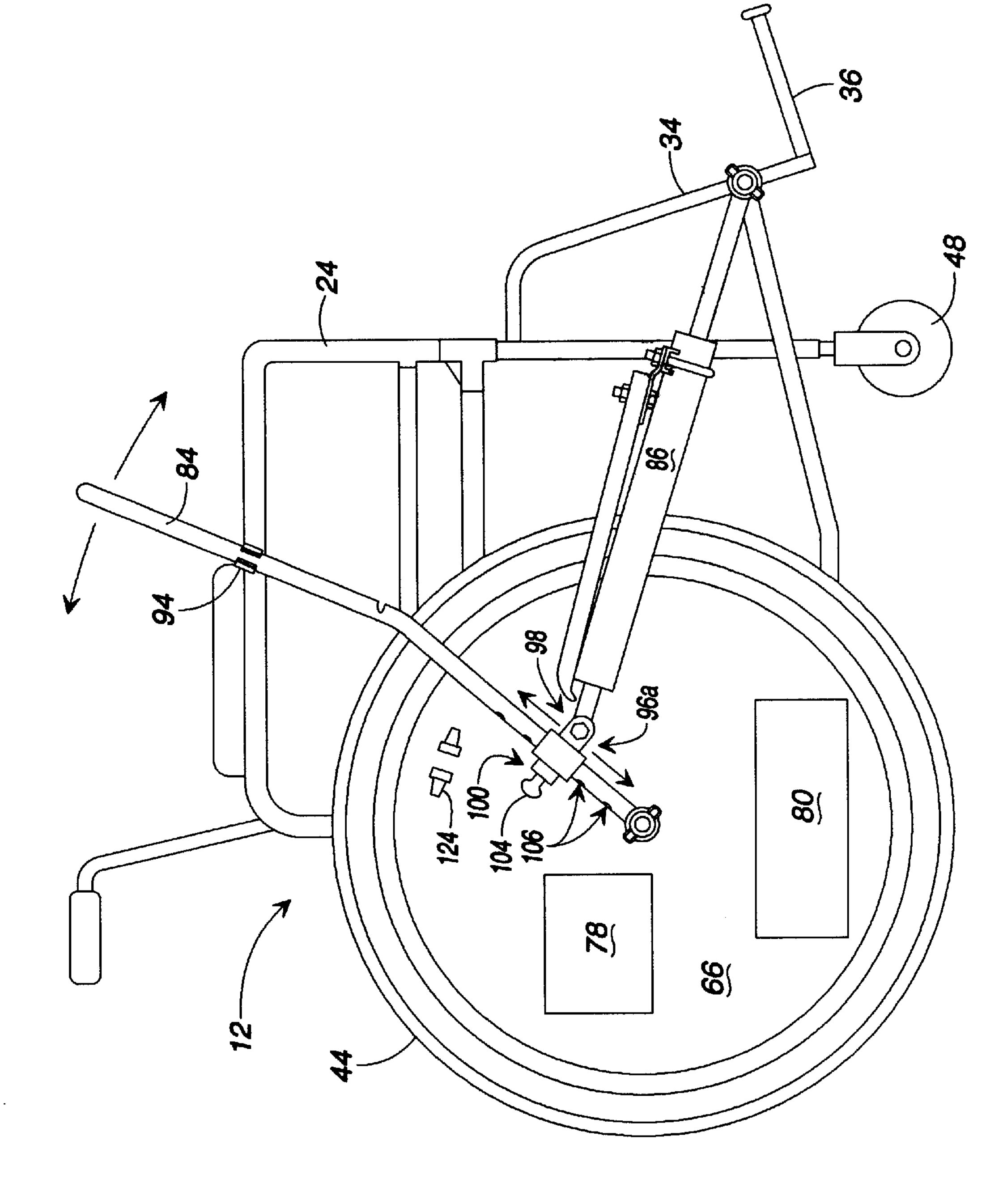
FIG. 10 is a side view of the wheelchair of FIG. 6 showing the elongated handle in a rowing position for exercise from the wheelchair in accordance with the preferred embodiment of the present invention.

As shown by FIG. 10, rowing exercises are carried out by a user in the wheelchair by alternately pushing and pulling the elongated handles 84. The action of each elongated handle 84 on its cylinder assembly 86 is varied by the length of the elongated handle 84 and the distance of the first end 96*a* of the cylinder assembly 86 from the pivot point of the elongated handle 84, which is set by the binding mechanism 100. Thus, the action of the elongated handle 84 upon the cylinder assembly 86 varies as desired by a user.

From the foregoing description of the preferred embodiments and the several alternatives, other alternative constructions of the present invention may suggest themselves to those skilled in the art. Therefore, the scope of the present invention is to be limited only to the claims below and the equivalents thereof.

I claim:

1. A non-rotating wheel disk comprising:

(a) a disk for fixable attachment to an outer end of a non-rotating wheel axle spindle of a wheelchair:

(b) means for fixably attaching the disk to the outer end of the non-rotating wheel axle spindle; and (c) a pocket extending outwardly from an outer surface of the disk having an upwardly extending opening.

2. The non-rotating wheel disk as recited in claim 1, wherein the pocket is removably attached to the outer surface of the disk.

3. The non-rotating wheel disk as recited in claim 1 wherein the pocket extends from a bottom section of the outer surface of the disk, the pocket being sized to receive a catheter bag.

4. The non-rotating wheel disk as recited in claim 3, wherein the pocket is removably attached to the outer surface of the disk.

5. The non-rotating wheel disk as recited in claim 3, further comprising a second pocket extending from the outer surface of the disk.

6. The non-rotating wheel disk as recited in claim 5, wherein the pocket and the second pocket are removably attached to the outer surface of the disk.

7. The non-rotating wheel disk as recited in claim 6, wherein the disk has a circumference with a padding disposed along the circumference, the padding comprising open cell-foam rubber having an adhesive backing.

* * * * *